United States Patent Office 3,661,890
Patented May 9, 1972

3,661,890
PREPARATION OF QUERCETIN DERIVATIVES
Leonard Jurd, Berkeley, Calif., assignor to the United States of America as represented by the Secretary of Agriculture
No Drawing. Filed Mar. 10, 1970, Ser. No. 18,314
Int. Cl. C07c 47/18
U.S. Cl. 260—210 F                                   4 Claims

ABSTRACT OF THE DISCLOSURE

Process for converting rutin into a 3-O-alkyl quercetin. Example: (a) Rutin is reacted with an excess of benzoyl chloride to benzoylate all the free phenolic hydroxy groups of the rutin, thus to produce 5,7,3',4'-tetra-O-benzoyl rutin. (b) This compound is then hydrolyzed in an acidic medium to split off the rutinoside group while retaining the benzoic acid groups, thus to produce 5,7,3',4'-tetra-O-benzoyl quercetin. (c) This compound is alkylated to produce 3 - O - alkyl - 5,7,3',4' - tetra - O-benzoyl quercetin, which is then (d) hydrolyzed to yield the final product 3-O-alkyl quercetin. Another phase of the disclosure concerns the conversion of rutin into 7-O-benzoyl quercetin. This is accomplished by reacting rutin with benzoyl chloride in the presence of borax to cause selective benzoylation of the rutin in the 7 position. The resulting intermediate (7-O-benzoyl rutin) is then hydrolyzed in an acid medium, yielding the desired end product 7-O-benzoyl quercetin.

A non-exclusive, irrevocable, royalty-free license in the invention herein described, throughout the world for all purposes of the United States Government, with the power to grant sublicenses for such purposes, is hereby granted to the Government of the United States of America.

A portion of this invention is described—but not claimed—in the copending application of Leonard Jurd and Alfred Douglas King, Jr., entitled Antimicrobial Agents and Use Thereof, Ser. No. 15,302, filed Feb. 27, 1970 (Docket No. PC 5228).

This invention relates to and has among its objects the provision of novel processes for synthesizing quercetin derivatives. Further objects of the invention will be evident from the following description wherein parts and percentages are by weight unless otherwise specified. The abbreviation p.p.m. used herein refers to parts per million. Temperatures are given in degrees centigrade. The symbol Ph is used to represent

The structure of quercetin is provided below to furnish a key to visualizing the structures of the derivatives of the invention and various intermediates.

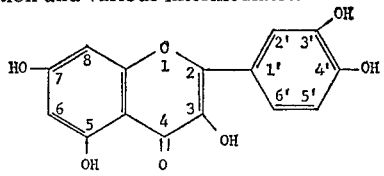

(I)

As evident from Formula I, quercetin contains 5 hydroxyl groups and thus can be readily visualized as the parent compound for a wide variety of ether derivatives. The synthesis of such ethers is a relatively simple matter if one desires a derivative wherein a plurality of the hydroxyls are etherified. It is, however, quite difficult if a selected one of the hydroxyls is to be etherified.

One of the objects of the invention is to provide novel procedures for preparing 3-O-alkyl quercetins, that is, compounds corresponding to the formula

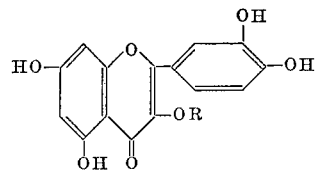

wherein R is an alkyl radical.

The starting material for the synthesis is rutin, a substance which is available from buckwheat and other plants, and which is a glycoside of quercetin, specifically the 3-rutinoside thereof. The structure of rutin can be visualized from Formula I wherein the substituent at the 3 position is rutinosyl-O- rather than hydroxyl.

In a first step in the synthesis, rutin is benzoylated at the 5, 7, 3', and 4' positions. This is readily accomplished by the Schotten-Baumann technique. Rutin is dissolved in water containing about 10% of a strongly-basic material such as potassium hydroxide or carbonate or sodium hydroxide or carbonate. To this solution is added benzoyl chloride, the latter being provided in excess over the theoretical amount, preferably about 10–25 moles thereof per mole of rutin. The reaction is carried out at a relatively low temperature—about 5–30°—to avoid hydrolysis effects, and at such temperature range the reaction goes to completion in a short time and the tetra-benzoic ester precipitates out and is readily collected by filtration or centrifugation. The product is 5,7,3',4'-tetra-O-benzoyl rutin; its structure may be visualized from Formula I wherein the substituents at positions 5, 7, 3', and 4' are

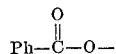

and the substituent at position 3 is rutinosyl-O-.

In a second step in the synthesis the aforesaid tetra-benzoic ester is subjected to acid hydrolysis to remove the glycosidic group, that is, to convert the substituent at position 3 from rutinosyl-O- to —OH, without affecting the four benzoic ester groups. To this end, the tetra-benzoic ester is dissolved in an alcohol (methyl, ethyl, or isopropyl, for example), using heating if necessary to get the intermediate into solution. The solution is then made strongly acid by adding hydrochloric or sulphuric acid and the reaction mixture is heated at steam-bath temperature or about 65–100°. The reaction mixture is then diluted with water whereby the hydrolysis product is precipitated as an oily material. It may be purified, for example, by recrystallization from acetone or acetone-methanol. The product, 5,7,3',4'-tetra-O-benzoyl quercetin has the structure as shown in Formula I above wherein the substituents at the 5, 7, 3', and 4' positions are each

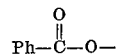

It is evident that there has now been achieved a situation wherein all the hydroxyls except that at position 3 are blocked. Arriving at this desirable situation is the result of several critical aspects of the invention. One is that the initial esterification (Step 1) is done with a benzoylating agent. This provides the benefit that when hydrolysis is applied (in Step 2) the ester groups are retained intact while only the glycosidic linkage is hydrolyzed. Were one to initially esterify with an aliphatic esterification agent, such as acetyl chloride, the desired selective hydrolysis could not be attained—the acetic ester groups as well as the glycoside group would be hydrolyzed. Another key item in the synthesis is that the hydrolysis (in Step 2) is conducted under acid conditions, thus retaining the benzoic ester groups while hydrolyzing the glycoside group. If one were to use alkaline hydrolysis, the benzoic ester groups would be hydrolyzed—i.e., rutin would be reformed.

In a third step of the process, the hydrolysis product (5,7,3',4'-tetra-O-benzoyl quercetin) is alkylated to yield the desired 3-O-alkyl derivative. This step is simple and requires no critical conditions because all the hydroxyls except that at the 3 position are blocked. Thus, the alkylation is carried out as is conventional when etherifying a monohydric phenol. A typical procedure is to etherify by reaction with an alkyl chloride, bromide, or iodide. It is obvious that by selection of the etherifying agent, any desired ether group can be introduced at position 7. For example, the use of methyl iodide or bromide will yield the 3-O-methyl derivative, the use of isopropyl iodide, chloride, or bromide will yield the 3-O-isopropyl derivative. Illustrative examples of suitable etherifying agents are represented by the Formula R—X wherein X is chlorine, bromine, or iodine, and R represents an alkyl group such as methyl, ethyl, propyl, isopropyl, n-butyl, tert-butyl, hexyl, octyl, decyl, 2-ethylhexyl, and the like. Instead of the halides, one can use the corresponding sulphates such as dimethyl sulphate, diethyl sulphate, or the like. Usually, the etherification is carried out in an inert solvent such as acetone, methyl-ethyl ketone, dioxane, or the like in the presence of an alkaline agent such as potassium carbonate to take up the hydrogen halide or other acidic by-product developed in the etherification, and at a temperature of about 50°–100°. The product formed in this step is a 3-O-alkyl-5,7,3',4' - tetra - O - benzoyl quercetin. Its structure can be visualized from Formula I where the substituent at position 3 is RO— and the substituents at positions 5, 7, 3', and 4' are $$Ph-\overset{O}{\underset{\|}{C}}-O-$$

In the fourth step in the synthesis, the 3-O-alkyl-5,7,3',4'-tetra-O-benzoyl quercetin is hydrolyzed to convert the benzoic ester groups to hydroxyl groups without affecting the alkoxy group at position 3. A conventional alkaline hydrolysis does this job neatly. Typically, the product of Step 3 is contacted with an aqueous solution containing an alkaline agent such as potassium hydroxide or carbonate, sodium hydroxide or carbonate, in at least the amount required to react with all the benzoyl groups. To promote contact between the quercetin derivative and the alkali, a water-miscible solvent such as methanol, ethanol, isopropanol, acetone, etc. is preferably added to the reaction mixture. To expedite the hydrolysis the reaction mixture is heated to about 50–100°; usually heating on the steam bath is preferred. The alkaline hydrolysis product produces a salt of 3-O-alkyl quercetin, and to convert the salt into the free hydroxy or phenol form, the hydrolysis product is acidified with an acid such as hydrochloric, sulphuric, phosphoric, or the like. The product may be recovered by evaporating the liquid portion of the acidified hydrolysis mixture and purified by crystallization from aqueous methanol or other water-miscible alcohol. This fourth step yields the desired end product—the 3-O-alkyl quercetin.

The synthesis of 3-O-alkyl quercetein is summarized in the following formulas, using a simplified representation of the quercetin nucleus.

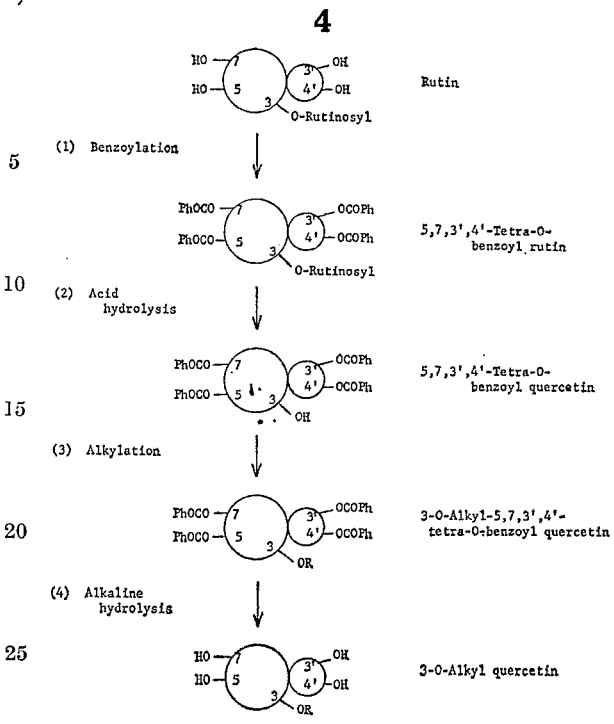

The invention is further demonstrated by the following illustrative examples:

EXAMPLE 1

Synthesis of 3-O-methyl quercetin (a) Benzoyl chloride (80 ml.) was added in two portions during 10 minutes to a solution of rutin (20 g.) and potassium carbonate (160 g.) in water (1.5 liters). After shaking the reaction mixture at room temperature for 40 minutes, the precipitated solid, 5,7,3',4'-tetra-O-benzoyl rutin, was collected.

(b) The product of Step a was dissolved in boiling ethanol (300 ml.). Concentrated hydrochloric acid (60 ml.) was added and the clear solution was heated on a steam bath for 1 hour. Water (250 ml.) was added. The oil which separated solidified on cooling. It was collected, dissolved in acetone, diluted with methanol and concentrated until most of the acetone had distilled. The crystalline solid which separated from the hot methanol solution was collected (8.4 g.; M.P. 204–205°). Recrystallized from acetone-methanol, 5,7,3',4'-tetra-O-benzoyl quercetin separated as slightly yellow, granular crystals, M.P. 209° (7.8 g.). If the tetrabenzoate is allowed to crystallize slowly from acetone alone it separates in cream-colored needles which melt at about 126–130°, resolidify and then melt at 209°.

Calcd. for $C_{43}H_{26}O_{11}$ (percent): C, 71.85; H, 3.65. Found (percent): C, 71.4; H, 3.71.

(c) 5,7,3',4'-tetra-O-benzoyl quercetin (19.5 g.) was methylated by refluxing with dimethyl sulphate (25 ml.), potassium carbonate (40 g.), and acetone (500 ml.) for 2 hours. The reaction mixture was then evaporated to remove solvent, the residue mixed with water, and the undissolved solid residue was collected and crystallized from ethyl acetate and from acetone-methanol. The product, 3-O-methyl-5,7,3',4'-tetra-O-benzoyl quercetin, was obtained as colorless needles, M.P. 181° (16.8 g.).

Calcd. for $C_{44}H_{28}O_4$ (percent): C, 72.1; H, 3.85; 1 MeO—, 4.24. Found (percent): C, 71.7; H, 3.96; MeO—, 4.77.

(d) Potassium hydroxide (15 g.) was added to a suspension of 11 g. of product c in warm methanol (100 ml.). The resulting clear solution was diluted with water (100 ml.), warmed on the steam bath for 5 minutes and acidified with HCl. The mixture was concentrated until most of the methanol had distilled. The yellow product was collected, washed with benzene and recrystallized from aqueous methanol. 3-O-methylquercetin separated as yellow needles, M.P. 275°, (lit. M.P. 273–275°) (4.1 g.).

Calcd. for $C_{16}H_{12}O_7$ (percent): C, 60.75; H, 3.83; 1 MeO—, 9.87. Found (percent): C, 60.8; H, 3.90; MeO—, 9.73.

Its identity was confirmed by acetylating it. 3-O-methylquercetin tetraacetate separated from acetone-methanol as colorless needles, M.P. 183–184° (lit. M.P. 182–184°).

Calcd. for $C_{25}H_{20}O_{11}$ (percent): C, 59.5; H, 4.16; 1 MeO—, 6.44; 4 $CH_3CO$—, 35.5. Found (percent): C, 59.5; H, 4.28; MeO—, 6.34; $CH_3CO$—, 35.4.

Another aspect of the invention concerns the preparation of 7-O-benzoylquercetin. The structure of this compound can be visualized from Formula I above wherein the substituent at position 7 is

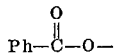

instead of —OH.

In a first step in the synthesis, rutin is selectively benzoylated at the 7 position, using a novel modification of the Schotten-Baumann technique. Rutin is dissolved in water containing about 5–10% of borax. To this solution is added benzoyl chloride, the latter being provided in excess over the theoretical amount, preferably about 5–8 moles thereof per mole of rutin. The reaction is carried out at a relatively low temperature—about 5 to 30°—to avoid hydrolysis effects, and at such temperaure range the reaction goes to completion in a short time. Removal of precipitated benzoic acid from the reaction mixture leaves a solution containing 7-O-benzoyl rutin in salt form. Without isolating this intermediate, it is subjected to acid hydrolysis to convert the rutinosyl-O-group to a hydroxyl group, yet wtihout hydrolyzing the benzoic ester group. To this end, the aqueous solution of the intermediate resulting from the above-described step is made strongly acidic by adding hydrochloric acid or sulphuric acid, and the solution is heated at steam-bath temperature or about 50–100°. The product, 7-O-benzoyl quercetin, separates out of solution and may be purified by crystallization from acetone-methanol.

A key item in the preparation of 7-O-benzoyl quercetin is that the benzoylation is performed in the presence of borax. Thereby the course of the benzoylation is selectively directed to the 7 position. This action of borax is believed to be due to several factors. The borax chelates the ortho hydroxyls at positions 3' and 4' and so prevents their benzoylation; it ionizes the hydroxyl at position 7 so it is responsive to benzoylation. As for the remaining phenolic hydroxyl group (that at position 5) it is believed that this hydroxyl is hydrogen-bonded with the 4-carbonyl group, hence unreactive in the benzoylation. Another important item is that in the second step, the hydrolysis is conducted under acid conditions, thus retaining the benzoic ester group while hydrolyzing the glycoside group. If one were to use alkaline hydrolysis, the benzoic ester group would be hydrolyzed—i.e., rutin would be re-formed.

The synthesis of 7-O-benzoyl quercetin is summarized in the following formulas, using a simplified representation of the quercetin nucleus.

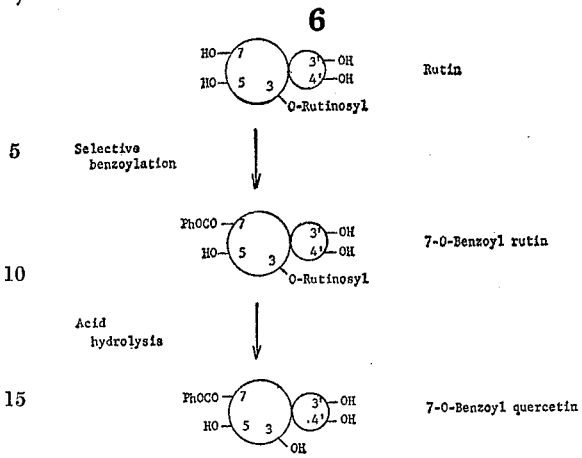

The invention is further demonstrated by the following illustrative example:

EXAMPLE 2

Synthesis of 7-O-benzoylquercetin

Benzoyl chloride (25 ml.) was added to a vigorously stirred solution of rutin (20.0 g.) and borax (30 g.) in water (400 ml.) at room temperature. After 10 minutes precipitated benzoic acid was filtered off, and the filtrate was treated with concentrated hydrochloric acid (100 ml.) and heated on a steam-bath for 30 minutes. The yellow solid which separated was collected and recrystallized from acetone-methanol (10.3 g.). The product, 7-O-benzoylquercetin, separated as yellow needles, M.P. 231–232°, which gave an intense green-grown color with alcoholic ferric chloride.

Calcd. for $C_{22}H_{14}O_8$ (percent): C, 65.0; H, 3.47. Found (percent): C, 65.1; H, 3.67.

Its identity was confirmed by acetylating it. The acetylated derivative, 4-O-benzoylquercetin tetraacetate, crystallized from methanol as colored needles, M.P. 184–185°.

Calcd. for $C_{30}H_{22}O_{12}$ (percent): C, 62.7; H, 3.86. Found (percent): C, 62.7; H, 3.99.

The 3-O-alkyl quercetins and 7-benzoyl quercetin are compounds generally useful in organic synthesis, and particluarly useful because they inhibit microbial growth. They may, therefore, be used to preserve substances which are normally subject to microbial spoilage, for example, foods, animal glues and mucilages, starch pastes and solutions, animal feeds and tankage, etc. For example, the use of quercetin derivatives for such purposes is disclosed and claimed in the copending application of Leonard Jurd and Alfred Douglas King, Jr., Ser. No. 15,302, filed Feb. 27,1970 (Docket No. PC 5228). The following information present in said application is illustrative.

The compound, 3-O-methylquercetin, at a concentration of 500 p.p.m., was found to inhibit growth of *Achromobacter hartlebii, Aerobacter aerogenes, Alcaligenes faecalis, Bacillus cadaveri, B. cereus, B. Megatherium, Escherichia coli, Micrococcus lysodeikticus, Proteus vulgaris, Pseduomonas aeruginosae, Staphylococcus aureus,* and *Streptococcus mitis.* Its ability to prevent souring of milk is illustrated by the following:

A lot of fresh skim milk was divided into two 100-ml. samples. Into one sample was incorporated sufficient 3-O-methylquercetin to give a concentration thereof of 500 p.p.m. Each sample was inoculated by adding 1 ml. of skim milk which had been allowed to stand at room temperature for several hours. The two samples were then held in an incubator at 28° for 3 days, and examined at the end of this period. The control sample was found to be separated into curds and whey; the treated sample was still homogeneous.

The compound, 7-O-benzoyl quercetin, at a concentration of 500 p.p.m., was found to inhibit growth of *Achromobacter hartlebii, Bacillus cereus, Bacillus megatherium, Micrococcus lysodeikticus,* and *Proteus vulgaris.*

Having thus described the invention, what is claimed is:
1. A process for preparing a 3-O-alkyl quercetin which comprises:
 (a) reacting rutin with an excess of benzoyl chloride to benzoylate all the free phenolic hydroxy groups of the rutin, thus to produce 5,7,3',4'-tetra-O-benzoyl rutin,
 (b) hydrolyzing the product of Step a in an acidic medium to split off the rutinoside group while retaining the benzoic acid groups, thus to produce 5,7,3',4'-tetra-O-benzoyl quercetin,
 (c) reacting the product of Step b with an alkylating agent to proudce 3-O-alkyl-5,7,3',4'-tetra-O-benzoyl quercetin, and
 (d) hydrolyzing the product of Step c in an alkaline medium to produce 3-O-alkyl quercetin.

2. The process of claim 1 wherein the alkylating agent of Step c is a methylating agent, and the end product is 3-O-methylquercetin.

3. A process for preparing 7-O-benzoyl quercetin which comprises:
 (a) reacting rutin with benzoyl chloride in an aqueous borax solution to selectively benzoylate the rutin at the 7 position, and
 (b) hydrolyzing the resulting intermediate in an acid medium to split off the rutinoside group while retaining the benzoic ester group, thus to produce 7-benzoyl quercetin.

4. A process for preparing 7-O-benzoyl rutin which comprises reacting rutin with benzoyl chloride in an aqueous borax solution to selectively benzoylate the rutin at the 7 position.

References Cited
UNITED STATES PATENTS

| | | | |
|---|---|---|---|
| 2,680,119 | 1/1954 | Robertson et al. | 260—345.2 |
| 2,700,047 | 1/1955 | Wilson | 260—210 F |
| 2,715,121 | 8/1955 | Glen | 260—210 R |
| 3,153,035 | 10/1964 | Archer et al. | 260—210 F |
| 3,419,544 | 12/1968 | Witzel et al. | 260—234 R |

LEWIS GOTTS, Primary Examiner

J. R. BROWN, Assistant Examiner

U.S. Cl. X.R.

260—345.2